Sept. 13, 1938.  R. H. IMHOFE  2,130,090
ILLUMINATED SIGN FOR VEHICLES
Filed June 22, 1937
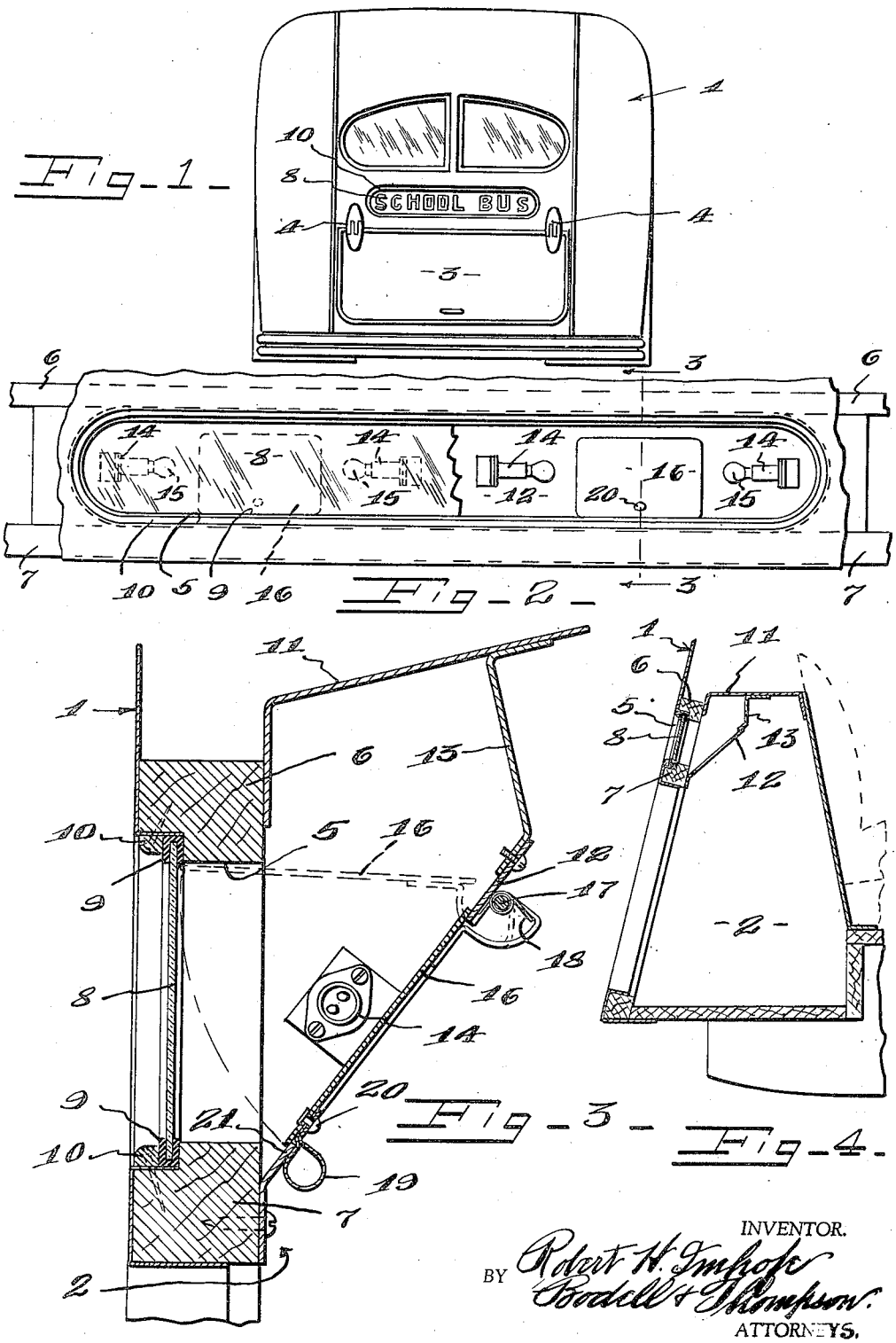
INVENTOR.
BY Robert H. Imhofe
Bodell & Thompson
ATTORNEYS.

Patented Sept. 13, 1938

2,130,090

UNITED STATES PATENT OFFICE 2,130,090

ILLUMINATED SIGN FOR VEHICLES

Robert H. Imhofe, Canastota, N. Y., assignor to Rex-Watson Corporation, Canastota, N. Y., a corporation of New York Application June 22, 1937, Serial No. 149,708

4 Claims. (Cl. 40—130)

This invention relates to signs or signals for motor vehicles, as buses, and has for its object a sign, particularly for the rear end of buses making frequent stops, as school buses, for giving warning to the traffic to take extra precaution in passing a school bus from the rear.

More specifically, it has for its object a sign or signal, which is readily built into the vehicle or bus body in the tool or luggage compartment, so as to take up minimum space and be readily accessible for removing and replacing lamp bulbs.

The invention consists in the novel features and in the combinations and constructions hereinafter set forth and claimed.

In describing this invention, reference is had to the accompanying drawing in which like characters designate corresponding parts in all the views.

Figure 1 is a rear elevation of a bus provided with this sign, showing the relative location thereof to a luggage compartment.

Figure 2 is an enlarged fragmentary elevation of the sign, and contiguous portions of the bus body.

Figure 3 is an enlarged sectional view on line 3—3, Figure 2, but shown as if the rear wall of the body were vertical instead of inclined.

Figure 4 is a sectional view through the rear end of the bus body and the rear compartment on the plane of line 3—3, Figure 2, parts being omitted, showing the relative location of the lamp housing to the tool or luggage compartment and the door thereof.

1 designates, generally, the bus body having a compartment 2, preferably in the rear end thereof, this compartment having a hinged door 3 hinged at one edge, usually its upper horizontal edge, at 4 to the body. 5 designates a window opening formed in the wall of the bus body adjacent the door 3, usually above the hinged edge of the door, this window opening being formed between two spaced apart transverse upper and lower frame members 6, 7, the door being hinged to the lower frame member 7.

8 is a glass mounted in the window opening in any suitable manner, it being here shown as having its margin seated in a channel-shaped seal 9, usually of rubber, and this seal is held in position in the opening by a stop or moulding 10.

11 is an inner wall, usually of sheet metal, which forms the top wall or facing of the compartment, this being secured at one edge to the frame member 6.

12 designates a partition inclining upwardly from the frame member 7 away from the window opening, this having an angular section 13, which is secured to the wall 11, the partition 12 and the section 13 thereof being also of sheet metal. The wall 11 and partition 12 forms a housing for the lamp sockets located in the rear of the window opening. 14 designate lamp sockets mounted at suitable intervals on the partition 12 in the rear of the window opening, and 15 designate lamp bulbs in said sockets.

The partition 12 is formed with movable doors 16 located in position to give access to the lamp sockets for the removal and replacement of the lamp bulbs, and to the wiring. As here shown, these doors are located between the lamp sockets so that two lamp sockets are accessible through each door when open. The doors 16 are here shown as hinged at 17 to the partition and movable inwardly about their hinges from the full line position (Figure 3) to the dotted line position. Each door is also preferably pressed by a spring 18 into closed position and may be held in closed position by suitable latch or button 19, this being pivoted at 20 to the lower margin of the door 16 and catching at 21 on the margin of the wall of the door opening in the partition 12. It may be turned about its pivot 20 out of engagement with the margin of the door opening, in order to permit the door 12 to be swung inwardly into the dotted line position. The glass may be provided with suitable lettering, it usually having applied thereto, the sign "School Bus" which is placed on the glass 8 by means of translucent decalcomania transfer. The window opening 5 with the glass therein for the sign is placed adjacent the hinged door 3 so that the lamps can be easily reached through said door 3 and the other doors 16.

By this construction, the sign does not project beyond the wall of the bus body and occupies minimum space within the compartment of the bus body. The lamp bulbs and wiring, not shown, are readily accessible by opening the door 3 and the doors 16.

What I claim is:

1. The combination with a bus body formed with a compartment in a wall thereof having a hinged door, the body being also formed with a window opening located adjacent one edge of the door, a partition mounted within the compartment in the rear of the window opening, lamp bulbs mounted on the partition, the partition being formed with doors operable through said first-mentioned door to give access to the lamp bulbs.

2. The combination with a bus body formed with a compartment in a wall thereof having a hinged door, the body having a window opening above the door opening, a partition in the compartment in the rear of the window opening and extending from the top of the compartment to the lower side of the window opening, and forming a housing in the rear of the window opening, lamp sockets mounted on the partition in the housing in the rear of the window opening, and movable doors in the partition operable through said first-mentioned door to open the box to give access to the lamp sockets.

3. The combination of a bus body formed with a compartment in a wall thereof having a door hinged at its upper edge, the body being also formed with a window opening above the hinged edge of the door, the compartment having an inner wall extending into the compartment from the upper side of the window opening, and a partition extending from the lower side of the window opening to said inner wall forming a housing in the rear of the window opening, said partition inclining upwardly and away from the window opening, and lamp sockets mounted on the partition in the rear of the window opening, the partition being provided with doors for giving access to the lamp sockets.

4. The combination with a bus body formed with a compartment in a wall thereof having a hinged door, the body including spaced transverse frame members to one of which the door is hinged, the frame members providing a window opening between them adjacent said hinged door, a window glass mounted in the opening; of a partition in the compartment in the rear of said window opening extending from one of said transverse members and forming a housing in the rear of the window opening, and lamp sockets mounted on the partition in the rear of the glass, and movable doors in the partition operable through said first-mentioned door to open the box to give access to the sockets.

ROBT. H. IMHOFE.